May 1, 1962 A. DUERKSEN 3,031,743
POWER RIM TOOL
Filed July 11, 1960 2 Sheets-Sheet 1
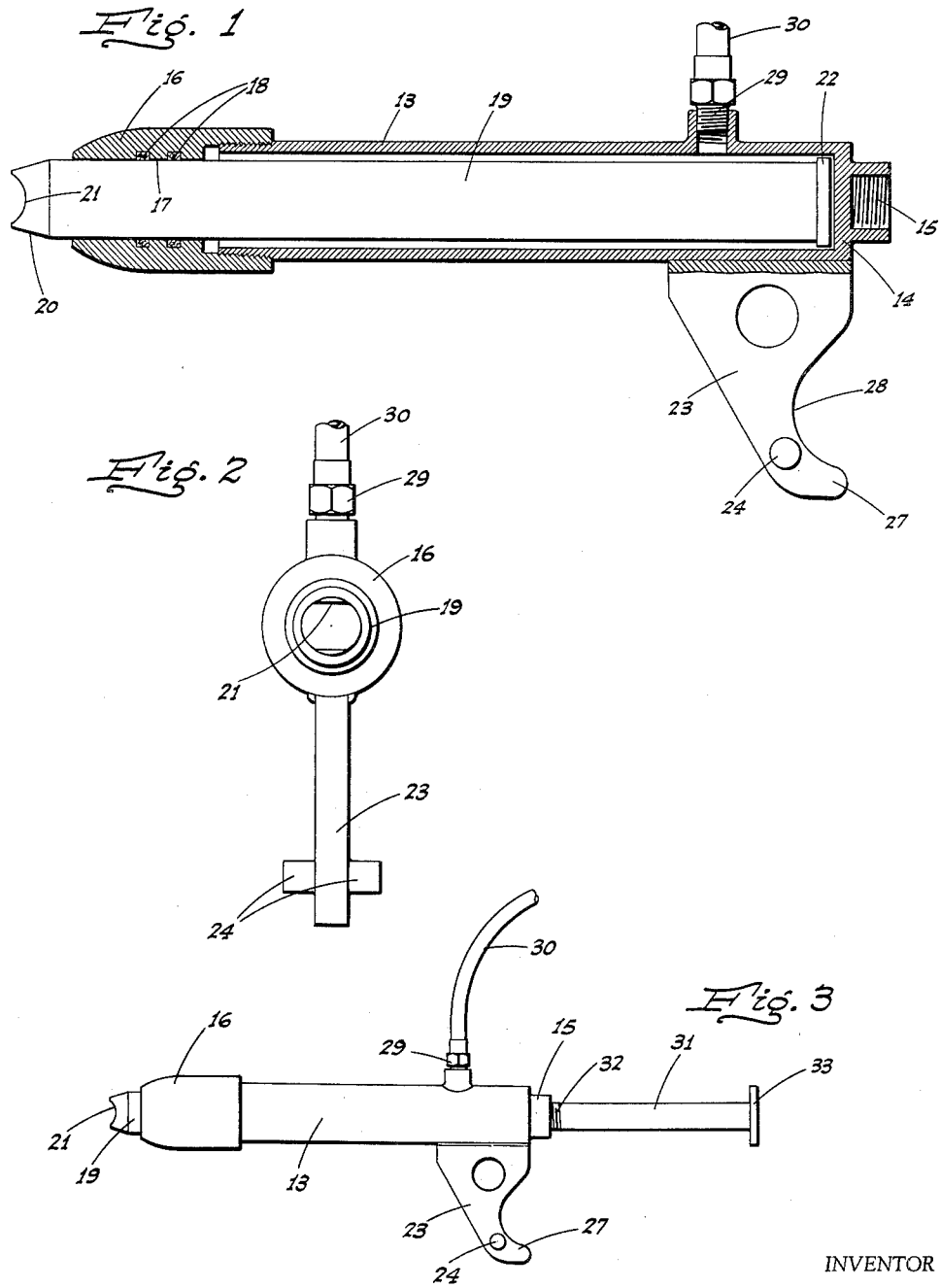
INVENTOR
Arnold Duerksen
BY Webster & Webster
ATTORNEYS May 1, 1962

A. DUERKSEN 3,031,743

POWER RIM TOOL

Filed July 11, 1960

United States Patent Office 3,031,743
Patented May 1, 1962

3,031,743
POWER RIM TOOL
Arnold Duerksen, Lodi, Calif., assignor to Super Mold Corporation of California, Lodi, Calif., a corporation of California
Filed July 11, 1960, Ser. No. 42,141
2 Claims. (Cl. 29—252)

This invention relates to a tool for opening and closing a sectional and foldable inside curing rim as used in a tire during retread vulcanization thereof. Such a rim is shown in United States Patent No. 2,817,877, dated December 31, 1957, and which rim was opened and closed by a hand operated tool as shown in said patent.

It has been found that the necessarily heavy rims used with large tires required excessive physical effort to manipulate such hand operated form of tool, and it is therefore the principal object of the present invention to provide a power operated tool, capable of being held in one hand, by means of which such a rim may be quickly and easily opened or closed.

A further object of the invention is to provide a tool for the purpose adapted, without manual adjustment, for use on rims of different passenger-car tire sizes, and may be easily and quickly extended by hand for use on large diameter truck tire rims of different sizes.

It is also an object of the invention to provide a power rim tool which is designed for ease and economy of manufacture.

Still another object of the invention is to provide a practical, reliable, and durable power rim tool, and one which will be exceedingly effective for the purpose for which it is designed.

These objects are accomplished by means of such structure and relative arrangement of parts as will fully appear by a perusal of the following specification and claims.

In the drawings:

FIG. 1 is a sectional elevation of the improved power tool in a fully contracted condition.

FIG. 2 is an end elevation of the tool.

FIG. 3 is a side elevation of the tool on a reduced scale, showing the lengthening extension member mounted thereon.

Figure 4:
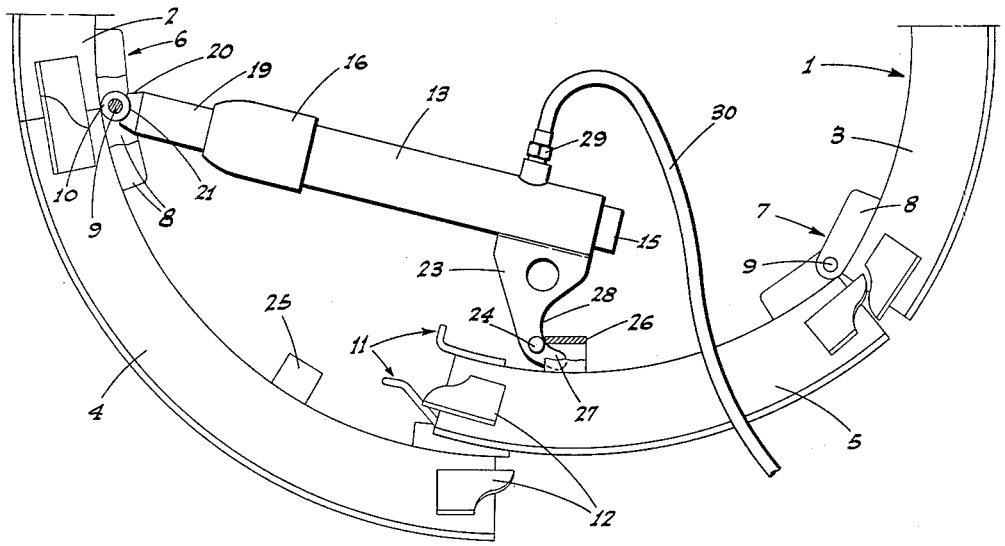
FIG. 4 is a fragmentary elevation of a sectional foldable rim as open, showing the power tool as applied thereto to close the rim.

Referring now more particularly to the drawings, and to the characters of reference marked thereon, the sectional foldable rim 1 to which the improved tool is applied comprises multiple sections of predetermined arcuate length, and certain ones of which are shown at 2, 3, 4, and 5. Sections 2 and 4 are permanently connected to each other at their adjacent ends by a transverse hinge 6, while sections 3 and 5 are similarly connected by a hinge 7; the hinges allowing of radially inward swinging of the various sections relative to each other. Each hinge comprises cooperating pairs of spaced ears 8 connected by a hinge pin 9, which has a spacer spool 10 thereabout between the ears.

Sections 4 and 5, however, are not hingedly connected together, but are releasably latched when in a closed position by suitable means, such as is shown in the aforementioned patent, or in the patent to William Sunday, No. 2,985,917, dated May 30, 1961, and as indicated at 11.

Sections 4 and 5 are arranged so that in operation section 5 must be opened first and closed later. It should also be noted that the overlapping lugs 12 on the sides of sections 4 and 5 at their adjacent ends, and which prevent lateral shifting of these sections relative to each other when closed, require a certain amount of separation of said rim sections circumferentially of the rim before they can be opened or closed; the rim being of resilient metal and tending to contract somewhat from its normal diameter, so that section 5 when open overlaps section 4, as shown in FIG. 4.

The improved tool which effects such separation of sections 4 and 5 relative to each other comprises an elongated cylinder 13 having a fixed closure head 14 at one end. A tapped socket 15 projects outwardly from the head 14 in axial alinement with the cylinder for a purpose which will be seen later. An elongated cap 16 is mounted on the other end of the cylinder, said cap having a bore 17 somewhat smaller than that of the cylinder and having sealing or packing glands 18 therein. These glands engage a plunger 19 slidable through the cap and which, when fully contracted into the cylinder to adjacent the closure head 14, project a short distance only from the cap 16, as shown in FIG. 1. At its outer end the plunger 19 is preferably tapered somewhat as shown at 20, so as to fit between the hinge ears 8, and is formed with a transverse or diametral cradle 21 of a size to fit the hinge-pin spool 10 of either hinge 6 or 7, as shown in FIG. 4. At the inner or opposite end of plunger 19 an enlarged head 22, having clearance with the cylinder wall, is secured on said plunger.

A rigid somewhat elongated ear 23 depends from the cylinder 13 radially and at the end thereof opposite the cap 16. This ear, adjacent its lower end, carries a cross pin 24 adapted to abut against the transversely spaced walls of sockets 25 or 26 which project radially inward from rim sections 4 and 5, respectively, intermediate their ends but relatively close to their adjacent ends, as shown.

A finger 27 on the ear 23 at its outer end projects therefrom in the direction of the adjacent end of the cylinder 13 to enter socket 25 or 26, as shown in FIG. 4, so as to locate the ear 23 transversely of the rim; the adjacent vertical wall of the ear above the finger being cut back or relieved, as shown at 28, so as to avoid contact with the transverse edge of a socket when the cross pin 24 is engaged with the sidewalls of such socket.

A fitting 29 for a fluid pressure hose 30 is mounted on and communicates with cylinder 13 in opposed relation to ear 23. When the tool is in operation the hose is connected to a controlled source of pressure, such as a portable manually actuated pump unit (not shown).

The straight line distance between the cross pin 24 and cradle 21, when the plunger is fully contracted into the cylinder 13, is somewhat less than the straight line distance between hinge 6 and socket 26 of rim section 5, or between hinge 7 and socket 25 of rim section 4.

When operating the tool to close a rim, the finger 27 of ear 23 is first inserted into socket 26 of the open rim section 5, so that the cross pin 24 abuts the sides of the socket, and with the plunger 19 pointing toward the hinge 6. The plunger is then advanced until the cradle 21 engages the hinge spool 10, as shown in FIG. 4. Fluid under pressure is then admitted to the cylinder 13 to further advance the plunger 19 with a forceful movement in order to elongate the tool sufficiently to spread the rim so that the lugs 12 will clear each other and thus enable the section 5 to swing radially out about hinge 7 so as to aline with the already closed rim section 4.

The pressure is then relieved from the cylinder so that the rim sections 4 and 5 will move circumferentially and into engagement with each other. The latch unit 11 may then be engaged to maintain the rim sections in such engagement.

The section 5, being engaged by the tool—at the socket

26—in radially offset relation to the axis of the cylinder and plunger unit, causes the closing pressure to be exerted on rim section 5 both in a circumferential and a radially outward direction. Also, when the rim sections are moved to a fully closed position relative to each other, there is ample space between the cylinder 13 and the latch unit 11 for the easy and convenient manual manipulation of said unit.

Figure 5:
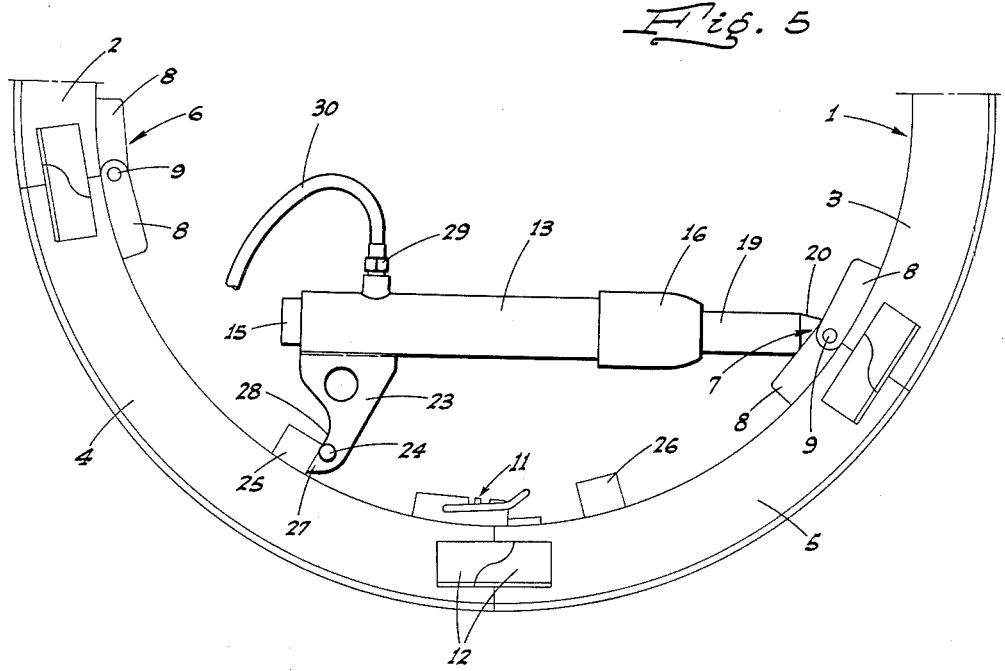
FIG. 5 is a similar view of the rim, but showing the same as closed and the power tool as applied to the rim to open the same, but before the latch is released.

When opening the rim, however, radially outward pressure on rim section 5 is not desired. The tool is therefore applied to the rim by engaging the finger 27 in socket 25 of rim section 4, and the cradle 21 of plunger 19 with the hinge spool of hinge 7, as shown in FIG. 5. With this positioning of the tool, and when pressure is applied to extend the plunger 19, there is a tendency to hold the rim section 4 closed, and to move the section 5 smoothly in a circumferential direction away from section 4. Also, with such reversed positioning of the tool it is well in the clear of the latch unit 11, so that the latter may be conveniently released even after the tool is mounted on the rim, as will be evident from FIG. 5.

The pressure hose fitting 29 being opposed to the ear 23 and set back from the end of the cylinder 16, keeps the hose 30 clear of the adjacent portion of the rim without making an excessively short bend when depending from the tool. The plunger head 22 of course forms a stop which limits the advance of the plunger in the cylinder, but—having clearance with the wall of the cylinder—does not prevent fluid in the fitting 29 from passing by said head to impart advancing movement to the plunger 19 if necessary before the head 22 advances beyond the fitting 29.

At times it may be desired to use the tool to open and close very large sectional foldable rims of a type which have stiffening ribs thereacross at intervals.

For this purpose a rigid extension rod 31 is provided. This rod is threaded at one end, as at 32, to engage the tapped socket 15, and at the other end the rod is provided with an enlarged flat sided head 33. This head is adapted to engage against a rib on one section of said large rim, while the cradle 21 at the opposite end of the tool engages on a rib of another section of the rim. When the tool is thus employed, the ear 23 is not used; the tool extending in straight chordal relation between opposed points on the rim.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A power tool for opening and closing a sectional and foldable curing rim, said rim including a pair of adjacent rim sections, hinges connecting said sections at their opposite ends to the rim for radial inward swinging movement from a closed circumferentially alined position, and rigid elements projecting radially inward from said sections intermediate their ends; the tool comprising a cylinder, a plunger slidable in and projecting from one end of the cylinder, the other end of the cylinder having a fixed closure, a flexible conduit connected to the cylinder to feed fluid thereto to advance the plunger from the cylinder, a cradle on the outer end of the plunger to engage the hinge of one rim section, the other rim section having a socket facing away from the hinge of said other rim section, an ear rigid with and projecting radially from the cylinder at said other end thereof, and a finger projecting from the ear at its outer end in the direction of said other end of the cylinder to seat in the socket.

2. A power tool for opening and closing a sectional and foldable curing rim, said rim including a pair of adjacent rim sections, hinges connecting said sections at their opposite ends to the rim for radial inward swinging movement from a closed circumferentially alined position, and rigid elements projecting radially inward from said sections intermediate their ends; the tool comprising a cylinder, a plunger slidable in and projecting from one end of the cylinder, the other end of the cylinder having a fixed closure, a flexible conduit connected to the cylinder to feed fluid thereto to advance the plunger from the cylinder, an element on the outer end of the plunger to engage the hinge of one rim section, the other rim section having a socket facing away from the hinge of said other rim section, an ear rigid with and projecting radially from the cylinder at said other end thereof, a finger projecting from the ear at its outer end in the direction of said other end of the cylinder to seat in the socket, and a cross pin on the ear adjacent the finger to engage the sidewalls of a rim-socket and limit the projection of the finger into such socket.

References Cited in the file of this patent

UNITED STATES PATENTS

| | | |
|---|---|---|
| 254,741 | Walsh | Mar. 7, 1882 |
| 1,483,831 | O'Brien | Feb. 12, 1924 |
| 1,591,898 | Wager | July 6, 1926 |
| 1,907,835 | Langbein | May 9, 1933 |
| 2,259,533 | Pfauser | Oct. 21, 1941 |
| 2,817,877 | Fannen | Dec. 31, 1957 |

OTHER REFERENCES

"Blackhawk Service Manual #239P," pp. 4, 5, 6, 8, 9, 11, 13, 14, 21, 25, published by Blackhawk Mfg. Co., Milwaukee, Wisconsin.